(12) United States Patent
Ho

(10) Patent No.: US 12,591,681 B2
(45) Date of Patent: Mar. 31, 2026

(54) FIRMWARE VERIFICATION METHOD

(71) Applicant: MITAC COMPUTING TECHNOLOGY CORPORATION, Taoyuan City (TW)

(72) Inventor: Shu-Chi Ho, Taoyuan City (TW)

(73) Assignee: MITAC COMPUTING TECHNOLOGY CORPORATION, Taoyuan City (TW)

( * ) Notice: Subject to any disclaimer, the term of this patent is extended or adjusted under 35 U.S.C. 154(b) by 114 days.

(21) Appl. No.: 18/823,385

(22) Filed: Sep. 3, 2024

(65) Prior Publication Data

US 2025/0322071 A1     Oct. 16, 2025

(30) Foreign Application Priority Data

Apr. 10, 2024    (TW) ................................. 113113436

(51) Int. Cl.
  *G06F 21/57*          (2013.01)
  *G06F 21/72*          (2013.01)
(52) U.S. Cl.
  CPC ............ *G06F 21/572* (2013.01); *G06F 21/72* (2013.01)
(58) Field of Classification Search
  None
  See application file for complete search history.

(56) References Cited

U.S. PATENT DOCUMENTS

| | | | | | |
|---|---|---|---|---|---|
| 11,436,333 | B2 * | 9/2022 | Singh | .................... | G06F 21/572 |
| 11,520,891 | B1 * | 12/2022 | Karolitsky | ............ | H04L 9/3247 |
| 12,373,564 | B2 * | 7/2025 | Orlando | ................ | G06F 21/575 |
| 12,498,912 | B1 * | 12/2025 | Sundararaman | .......... | G06F 8/65 |
| 2006/0265581 | A1 * | 11/2006 | Sun | ........................ | G06F 9/4408 713/1 |
| 2014/0281456 | A1 * | 9/2014 | Mejia | .................... | G06F 21/575 713/2 |
| 2015/0072726 | A1 * | 3/2015 | Stern | ................... | H04W 12/086 455/552.1 |
| 2017/0046229 | A1 * | 2/2017 | Hsu | ........................ | G06F 9/441 |
| 2017/0090909 | A1 * | 3/2017 | Guo | ........................ | G06F 8/66 |
| 2017/0147356 | A1 * | 5/2017 | Kotary | ................... | G06F 21/72 |

(Continued)

FOREIGN PATENT DOCUMENTS

| | | | | |
|---|---|---|---|---|
| CN | 117311827 A | * | 12/2023 | ............ G06F 9/4411 |

*Primary Examiner* — Michael Pyzocha
(74) *Attorney, Agent, or Firm* — RABIN & BERDO, P.C.

(57)          ABSTRACT

A firmware verification method for a management system including a control circuit, a first protection circuit, a second protection circuit, a first memory and a second memory. The first memory includes first firmware including first secondary boot firmware and first primary boot firmware. The second memory includes second firmware including second secondary boot firmware and second primary boot firmware. The firmware verification method includes: when the control circuit boots according to the first memory, the first protection circuit verifying the first secondary boot firmware; when the first secondary boot firmware passes the verification, the control circuit verifying the second primary boot firmware according to the first primary boot firmware; when the second primary boot firmware passes the verification, the control circuit rebooting according to the second memory; and when the control circuit boots according to the second memory, the second protection circuit verifying the second secondary boot firmware.

20 Claims, 4 Drawing Sheets

(56) References Cited

U.S. PATENT DOCUMENTS

| | | |
|---|---|---|
| 2018/0285126 A1* | 10/2018 | Ganesan ............... G06F 9/4401 |
| 2018/0365425 A1* | 12/2018 | Packer Ali ........... G06F 9/4401 |
| 2019/0042754 A1* | 2/2019 | Jreij ..................... G06F 21/575 |
| 2020/0089889 A1* | 3/2020 | Kim ................... G06F 21/6209 |
| 2022/0197746 A1* | 6/2022 | Chu ......................... G06F 8/65 |
| 2023/0148253 A1* | 5/2023 | Cermak ............... G06F 3/0659 |
| | | 711/154 |
| 2023/0254162 A1* | 8/2023 | Liu ........................ G06F 21/62 |
| | | 713/171 |
| 2023/0267045 A1* | 8/2023 | Suryanarayana ..... G06F 9/4403 |
| | | 714/13 |
| 2023/0350666 A1* | 11/2023 | Peng ......................... G06F 8/65 |
| 2024/0143772 A1* | 5/2024 | Farrell ................. G06F 9/4401 |
| 2024/0311489 A1* | 9/2024 | Jin ........................ H04L 9/3247 |

* cited by examiner

13

14

FIRMWARE VERIFICATION METHOD

CROSS-REFERENCE TO RELATED APPLICATION

This non-provisional application claims priority under 35 U.S.C. § 119 (a) to patent Application No. 113113436 filed in Taiwan, R.O.C. on Apr. 10, 2024, the entire contents of which are hereby incorporated by reference.

BACKGROUND

Technical Field

The present invention relates to a security technology, in particular relates to a firmware verification method that combines firmware verification and firmware recovery.

Related Art

Secure Boot is an important security mechanism today, designed to ensure that servers and management systems only load digitally signed and verified trusted firmware during startup. In other words, only verified trusted firmware and boot program loaders can be loaded when the system starts up. This helps prevent the system from loading unauthorized or malicious firmware, thereby enhancing system security. Traditionally, servers and management systems verify the firmware loaded into the system through a Root of Trust (RoT) chip.

However, verifying the firmware loaded into the system through a Root of Trust (RoT) chip can cause the system to experience a system hang and become inoperable when the loaded firmware fails the verification.

SUMMARY

In some embodiments, a firmware verification method for a management system. The management system comprises a control circuit, a first protection circuit, a second protection circuit, a first memory, and a second memory. The first memory comprises first firmware. The first firmware comprises first secondary boot firmware and first primary boot firmware. The second memory comprises second firmware. The second firmware comprises second secondary boot firmware and second primary boot firmware. The firmware verification method comprises: when the control circuit boots according to the first memory, the first protection circuit verifying the first secondary boot firmware; when the first secondary boot firmware passes the verification, the control circuit verifying the second primary boot firmware according to the first primary boot firmware; when the second primary boot firmware passes the verification, the control circuit rebooting according to the second memory; and when the control circuit boots according to the second memory, the second protection circuit verifying the second secondary boot firmware.

In some embodiments, the firmware verification method further comprises: when the second primary boot firmware fails the verification, the control circuit overwriting the second firmware with the first firmware; and after the control circuit overwrites the second firmware with the first firmware, the first protection circuit re-verifying the first secondary boot firmware.

In some embodiments, the firmware verification method further comprises: when the second secondary boot firmware fails the verification, the control circuit overwriting the second firmware with the first firmware; and after the control circuit overwrites the second firmware with the first firmware, the first protection circuit re-verifying the first secondary boot firmware.

In some embodiments, the first primary boot firmware comprises a first primary signature key. The second primary boot firmware comprises a second primary signature key. The control circuit verifies the second primary boot firmware by comparing the first primary signature key and the second primary signature key.

In some embodiments, the first primary boot firmware comprises a first primary signature key. The control circuit verifies the second primary boot firmware by decrypting the second primary boot firmware using the first primary signature key.

In some embodiments, the first protection circuit comprises first protection firmware. The first protection firmware comprises a first protection signature key. The first secondary boot firmware comprises a first secondary signature key. The first protection circuit verifies the first secondary boot firmware by comparing the first protection signature key and the first secondary signature key.

In some embodiments, the second protection circuit comprises a second protection firmware. The second protection firmware comprises a second protection signature key. The second secondary boot firmware comprises a second secondary signature key. The second protection circuit verifies the second secondary boot firmware by comparing the second protection signature key and the second secondary signature key.

In some embodiments, the first memory is non-writable and can only be read.

In some embodiments, the first primary boot firmware comprises U-boot firmware and kernel firmware. The control circuit verifies the second primary boot firmware according to the U-boot firmware.

In some embodiments, the first protection circuit and the second protection circuit are Root of Trust (RoT) chips. The first protection firmware and the second protection firmware are Root of Trust (ROT) firmware.

In some embodiments, the first secondary boot firmware and the second secondary boot firmware are U-boot_SPL firmware.

In some embodiments, a system on a chip comprises a first memory, a second memory, a control circuit and a first protection circuit. The first memory comprises first firmware. The first firmware comprises first secondary boot firmware and first primary boot firmware. The second memory comprises second firmware. The second firmware comprises second secondary boot firmware and second primary boot firmware. The first protection circuit comprises first protection firmware. The first protection circuit is configured to verify the first secondary boot firmware when the control circuit boots according to the first memory. When the first secondary boot firmware passes the verification, the control circuit verifies the second primary boot firmware according to the first primary boot firmware, and when the second primary boot firmware passes the verification, the control circuit reboots according to the second memory.

In some embodiments, the system on a chip further comprises a second protection circuit. The second protection circuit comprises second protection firmware. The second protection circuit is configured to verify the second secondary boot firmware when the control circuit boots according to the second memory.

In some embodiments, when the second primary boot firmware fails the verification, the control circuit overwrites the second firmware with the first firmware, and after the control circuit overwrites the second firmware with the first firmware, the first protection circuit re-verifies the first secondary boot firmware.

In some embodiments, when the second secondary boot firmware fails the verification, the control circuit overwrites the second firmware with the first firmware, and after the control circuit overwrites the second firmware with the first firmware, the first protection circuit re-verifies the first secondary boot firmware.

The following will describe the detailed features and advantages of the instant disclosure in detail in the detailed description. The content of the description is sufficient for any person skilled in the art to comprehend the technical context of the instant disclosure and to implement it accordingly. According to the content, claims and drawings disclosed in the instant specification, any person skilled in the art can readily understand the goals and advantages of the instant disclosure.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
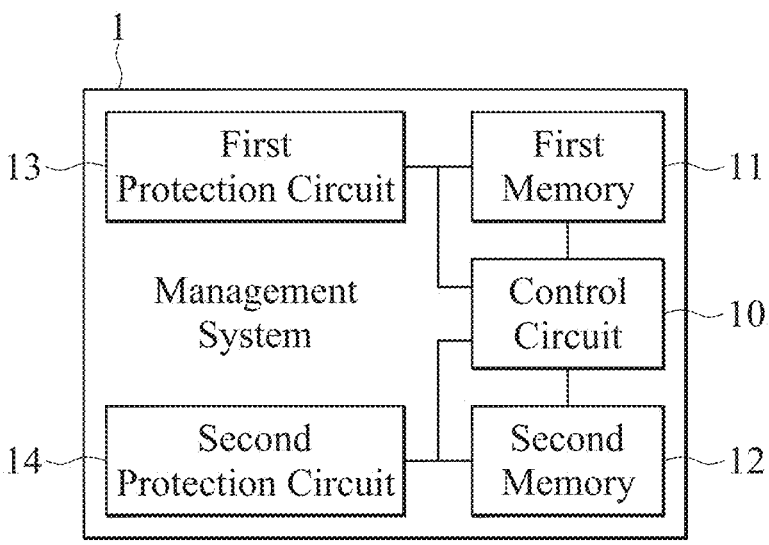
FIG. 1 illustrates a block schematic diagram of an embodiment of a management system.

Please refer to FIG. 1. A management system 1 comprises a control circuit 10, a first memory 11, a second memory 12, a first protection circuit 13, and a second protection circuit 14. The control circuit 10 is coupled to the first memory 11, the second memory 12, the first protection circuit 13, and the second protection circuit 14. The first protection circuit 13 is coupled to the first memory 11. The second protection circuit 14 is coupled to the second memory 12. In some embodiments, the control circuit 10 may be but not limited to a Baseboard Management Controller (BMC), a Field-Programmable Gate Array (FPGA), or a Complex Programmable Logic Device (CPLD). In some embodiments, the control circuit 10, the first protection circuit 13, and the second protection circuit 14 are disposed on different circuit boards. In some embodiments, the control circuit 10, the first protection circuit 13, and the second protection circuit 14 are electrically coupled or electrically connected as three separate chips, but the present invention is not limited thereto. In some embodiments, the control circuit 10 is integrated with either the first protection circuit 13 or the second protection circuit 14 on the same chip. In some embodiments, the control circuit 10 is integrated with both the first protection circuit 13 and the second protection circuit 14 on the same chip. In some embodiments, the first protection circuit 13 and the second protection circuit 14 may be but not limited to Root of Trust (ROT) chips, or other programmable logic devices (PLDs) or microcontrollers (MCUs). In some embodiments, the first memory 11 and the second memory 12 may be but not limited to flash memories, hard drives or other types of memory implementations. In some embodiments, the control circuit 10 and the second memory 12 are disposed on different circuit boards.

Figure 2A:
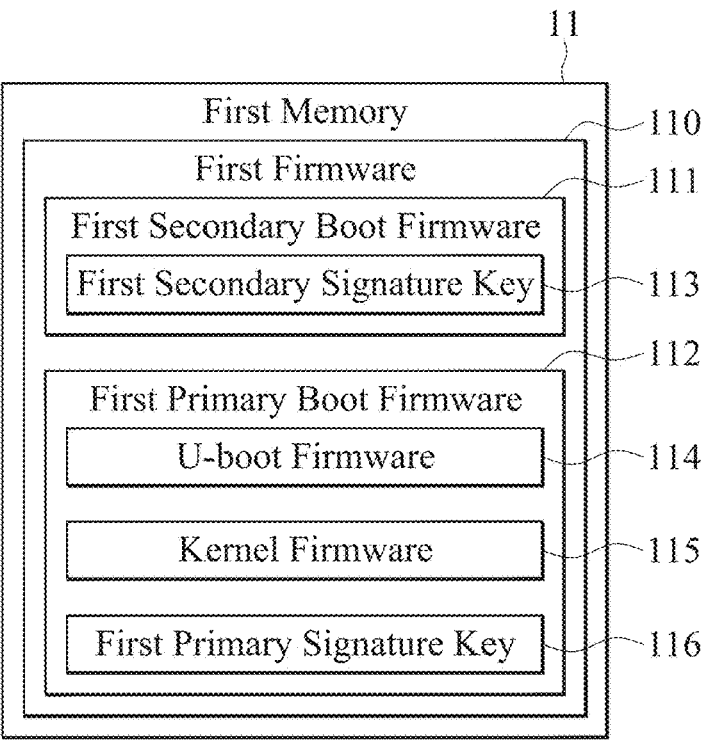
FIG. 2A illustrates a block schematic diagram of an embodiment of a first memory.
Figure 2B:
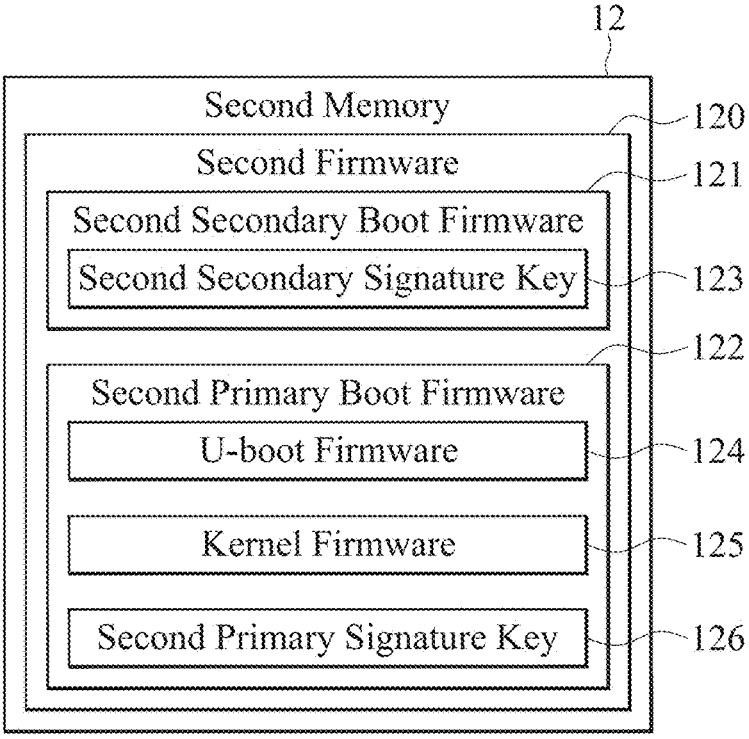
FIG. 2B illustrates a block schematic diagram of an embodiment of a second memory.

Please refer to FIG. 1 to FIG. 2B. The first memory 11 comprises first firmware 110. The first firmware 110 comprises first secondary boot firmware 111 and first primary boot firmware 112. The second memory 12 comprises second firmware 120. The second firmware 120 comprises second secondary boot firmware 121 and second primary boot firmware 122.

Figure 3:
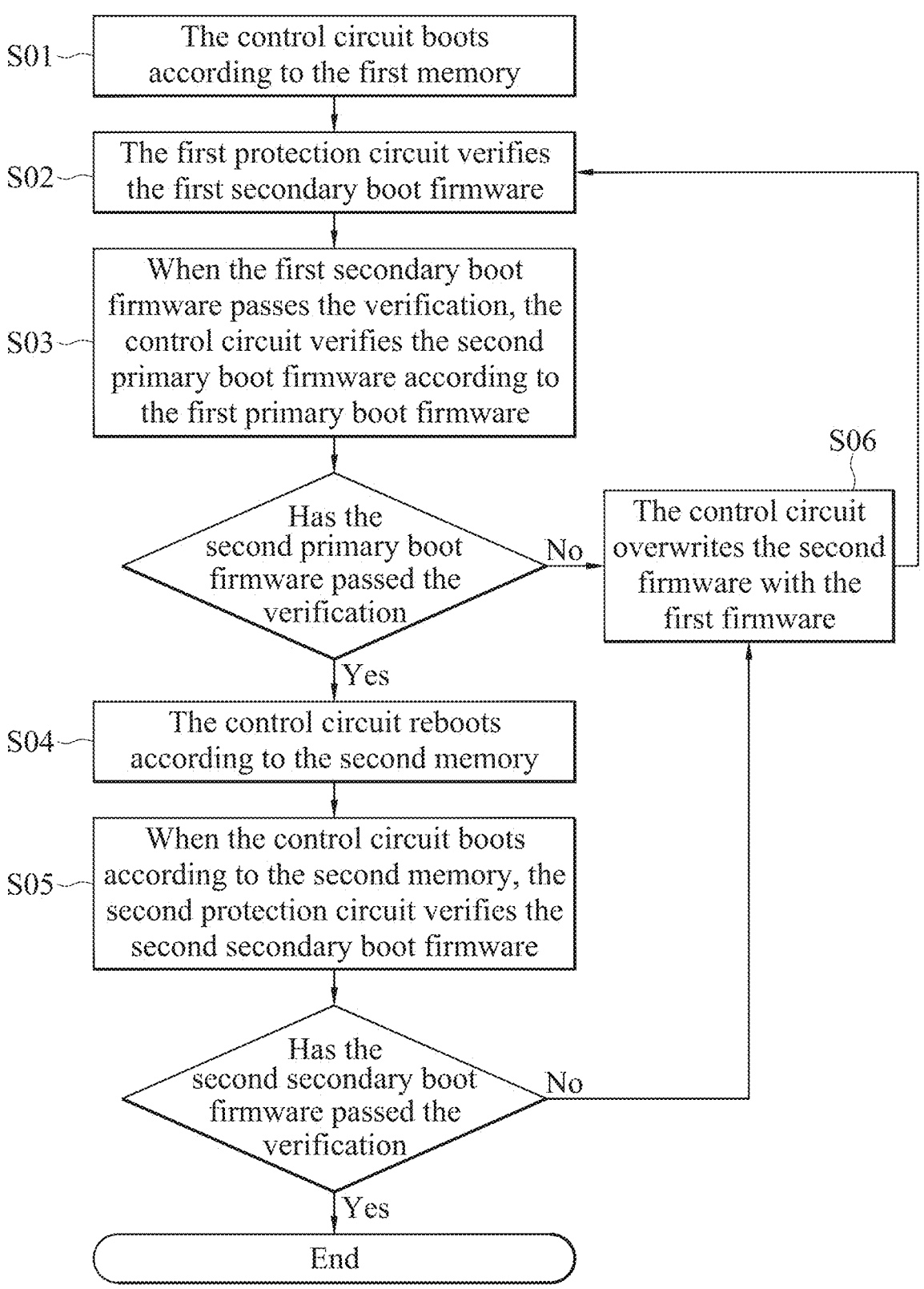
FIG. 3 illustrates a flowchart of an embodiment of a firmware verification method.
Figure 4A:
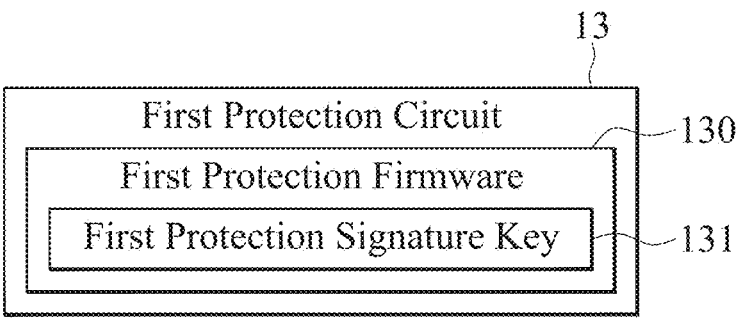
FIG. 4A illustrates a block schematic diagram of an embodiment of a first protection circuit.
Figure 4B:
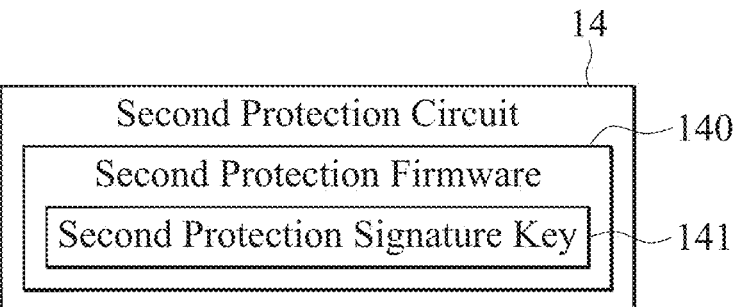
FIG. 4B illustrates a block schematic diagram of an embodiment of a second protection circuit.

Please refer to FIG. 1 to FIG. 3. When the management system 1 is first powered on, the control circuit 10 boots according to the first memory 11 (step S01). When the control circuit 10 boots according to the first memory 11, the first protection circuit 13 verifies the first secondary boot firmware 111 (step S02). When the first secondary boot firmware 111 passes the verification, the control circuit 10 verifies the second primary boot firmware 122 according to the first primary boot firmware 112 (step S03). When the second primary boot firmware 122 passes the verification, the control circuit 10 reboots according to the second memory 12 (step S04). When the control circuit 10 boots according to the second memory 12, the second protection circuit 14 verifies the second secondary boot firmware 121 (step S05). When the second primary boot firmware 122 or the second secondary boot firmware 121 fails the verification, the control circuit 10 overwrites the second firmware 120 with the first firmware 110 (step S06). After the control circuit 10 overwrites the second firmware 120 with the first firmware 110, it returns to the step S02 for the first protection circuit 13 to re-verify the first secondary boot firmware 111 and continues with the subsequent steps after the step S02. In some embodiments, when the control circuit 10 overwrites the second firmware 120 with the first firmware 110, it increments an overwrite count. If the overwrite count reaches an overwrite limit, the control circuit 10 terminates the firmware verification. If the overwrite count does not reach the overwrite limit, the control circuit 10 clears the overwrite count once the firmware verification is completed.

Please refer to FIG. 2A and FIG. 2B. In some embodiments, the first primary boot firmware 112 comprises a first primary signature key 116, and the second primary boot firmware 122 comprises a second primary signature key 126. In some embodiments, the control circuit 10 verifies the second primary boot firmware 122 by comparing the first primary signature key 116 and the second primary signature key 126, but the present invention is not limited thereto. In some embodiments, the control circuit 10 verifies the second primary boot firmware 122 by decrypting the second primary boot firmware 122 using the first primary signature key 116. In some embodiments, the control circuit 10 verifies the second primary boot firmware 122 by decrypting the second primary boot firmware 122 and then checking whether the internal data of the second primary boot firmware 122 is readable or determining whether specific data blocks within the second primary boot firmware 122 exist.

Please refer to FIG. 2A to FIG. 2B and FIG. 4A to FIG. 4B. In some embodiments, the first protection circuit 13 comprises first protection firmware 130. The first protection firmware 130 comprises a first protection signature key 131. The first secondary boot firmware 111 comprises a first secondary signature key 113. In some embodiments, the first protection circuit 13 verifies the first secondary boot firmware 111 by comparing the first protection signature key 131 and the first secondary signature key 113. In some embodiments, the second protection circuit 14 comprises second protection firmware 140. The second protection firmware 140 comprises a second protection signature key 141. The second secondary boot firmware 121 comprises a second secondary signature key 123. In some embodiments, the second protection circuit 14 verifies the second secondary boot firmware 121 by comparing the second protection signature key 141 and the second secondary signature key 123.

When the second primary boot firmware 122 or the second secondary boot firmware 121 fails the verification, the control circuit 10 overwrites the second firmware 120 with the first firmware 110 (step S06), and then performs verification again (i.e., step S02). Therefore, the management system 1 will not experience a system hang and unable to continue operating due to the second primary boot firmware 122 or the second secondary boot firmware 121 failing the verification. In other words, the management system 1 has both firmware verification and firmware recovery functions due to its recovery mechanism that repairs the second firmware 120 according to the first firmware 110, thereby avoiding system hangs.

In some embodiments, because the first firmware 110 is configured to repair the second firmware 120, the first firmware 110 must be a verified standard image (Golden Image). In some embodiments, the first firmware 110 is burned into the first memory 11 at the factory. To prevent any external modifications to the first firmware 110, in some embodiments, the first memory 11 is non-writable and can only be read. In some embodiments, since the first firmware 110 is a verified standard image, the first secondary boot firmware 111 must pass the verification in the step S02, and the first primary boot firmware 112 does not need to be verified. Therefore, the firmware verification method does not comprise a step for verifying the first primary boot firmware 112.

In some embodiments, the control circuit 10 comprises the first protection circuit 13 and the second protection circuit 14. In some embodiments, the control circuit 10 comprises a storage unit (not shown in FIGS.), where the first protection firmware 130 and the second protection firmware 140 are stored. In some embodiments, the storage unit may be but not limited to a Serial Peripheral Interface (SPI) flash memory or an Embedded Multimedia Card (eMMC) flash memory. In some embodiments, the first protection firmware 130 and the second protection firmware 140 are Root of Trust (RoT) firmware.

In some embodiments, the first primary boot firmware 112 comprises U-boot firmware 114 and kernel firmware 115. In some embodiments, the control circuit 10 verifies the second primary boot firmware 122 according to the U-boot firmware 114. In some embodiments, when the control circuit 10 verifies the second primary boot firmware 122 according to the U-boot firmware 114, the U-boot firmware 114 comprises the first primary signature key 116. In some embodiments, when the control circuit 10 verifies the second primary boot firmware 122 according to the U-boot firmware 114, the kernel firmware 115 is not used during the verification process. The kernel firmware 115 is only used as part of the first firmware 110 along with the U-boot firmware 114 and the first secondary boot firmware 111 to overwrite and repair the second firmware 120 to the second memory 12 when the second primary boot firmware 122 or the second secondary boot firmware 121 fails the verification.

In some embodiments, the first primary signature key 116 and the first secondary signature key 113 are the same signature key. In some embodiments, when the first primary signature key 116 and the first secondary signature key 113 are the same signature key, the first primary boot firmware 112 does not comprise the first primary signature key 116. Instead, the control circuit 10 verifies the second primary boot firmware 122 directly by comparing the first secondary signature key 113 and the second primary signature key 126.

In some embodiments, the second primary boot firmware 122 comprises U-boot firmware 124 and kernel firmware 125. In other words, in some embodiments, the control circuit 10 verifies the U-boot firmware 124 and the kernel firmware 125 according to the first primary boot firmware 112. In some embodiments, when the second primary boot firmware 122 comprises the U-boot firmware 124 and the kernel firmware 125, the U-boot firmware 124 comprises the second primary signature key 126. In some embodiments, the second primary signature key 126 comprises both a U-boot signature key and a kernel signature key. The U-boot firmware 124 comprises the U-boot signature key, and kernel firmware 125 comprises the kernel signature key. The control circuit 10 verifies the U-boot firmware 124 by comparing the first primary signature key 116 and the U-boot signature key and verifies the kernel firmware 125 by comparing the first primary signature key 116 and the kernel signature key to verify the second primary boot firmware 122.

In some embodiments, the second primary signature key 126 and the second secondary signature key 123 are the same signature key. In some embodiments, when the second primary signature key 126 and the second secondary signature key 123 are the same signature key, the second primary boot firmware 122 does not comprise the second primary signature key 126. Instead, the control circuit 10 directly verifies the second primary boot firmware 122 by comparing the first primary signature key 116 and the second secondary signature key 123.

In some embodiments, the first secondary boot firmware 111 and the second secondary boot firmware 121 are U-boot SPL firmware. In some embodiments, the first primary boot firmware 112 comprises the first secondary boot firmware 111, and the second primary boot firmware 122 comprises the second secondary boot firmware 121. In some embodiments, the U-boot firmware 114 comprises the first secondary boot firmware 111, and the U-boot firmware 124 comprises the second secondary boot firmware 121.

In some embodiments, situations where the second primary boot firmware 122 or the second secondary boot firmware 121 fails the verification may include but not limited to scenarios where the second firmware 120 is damaged or maliciously tampered with. For example, if the management system 1 experiences an unexpected power failure during the process of writing the second firmware 120 to the second memory 12, this could lead to damage of the second firmware 120, causing the second primary boot firmware 122 or the second secondary boot firmware 121 to fail the verification. If the second firmware 120 is replaced by an unauthorized party, it indicates malicious tampering, which would also cause the second primary boot firmware 122 or the second secondary boot firmware 121 to fail the verification. In some embodiments, situations where the second primary boot firmware 122 or the second secondary boot firmware 121 fails the verification may also include but not limited to physical damage to the second memory 12. In some embodiments, the second memory 12 further comprises an error log file. When the second primary boot firmware 122 or the second secondary boot firmware 121 fails the verification, the control circuit 10 records the failure or errors of the second firmware 120 in the error log file, allowing users of the management system 1 to review and analyze the reasons for the verification failure of the second primary boot firmware 122 or the second secondary boot firmware 121 according to the error log file.

To sum up, in some embodiments, when the second primary boot firmware 122 or the second secondary boot firmware 121 fails the verification, the control circuit 10 overwrites the second firmware 120 with the first firmware 110 and performs the verification again. Therefore, the management system 1 will not experience the system hang or become inoperable due to the failure of the second primary boot firmware 122 or the second secondary boot firmware 121. That is, the management system 1 has both firmware verification and firmware recovery functions due to its mechanism for repairing the second firmware 120 according to the first firmware 110, thereby avoiding the system hangs. Additionally, after powering on, the control circuit 10 performs a dual verification of the first firmware 110 and the second firmware 120, and verifies the second firmware 120 through the first firmware 110. The management system 1 is allowed to boot normally only after both the first firmware 110 and the second firmware 120 pass the verification. If either of the first firmware 110 and the second firmware 120 fails the verification, the boot process will not continue. Instead, it will initiate a repair and restart recovery mechanism. The boot process will only complete after both the first firmware 110 and the second firmware 120 pass the verification during the same restart process following a repair. This further enhances the security of the boot process and firmware execution.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A firmware verification method for a management system, wherein the management system comprises a control circuit, a first protection circuit, a second protection circuit, a first memory, and a second memory, the first memory comprises first firmware, the first firmware comprises first secondary boot firmware and first primary boot firmware, the second memory comprises second firmware, the second firmware comprises second secondary boot firmware and second primary boot firmware, and the firmware verification method comprises:

booting the control circuit according to the first memory, and the first protection circuit verifying the first secondary boot firmware;

in response to the first secondary boot firmware passing the verification, the control circuit verifying the second primary boot firmware according to the first primary boot firmware;

in response to the second primary boot firmware passing the verification, the control circuit rebooting according to the second memory; and in response to the control circuit booting according to the second memory, the second protection circuit verifying the second secondary boot firmware.

2. The firmware verification method according to claim 1, further comprising:

when the second primary boot firmware fails the verification, the control circuit overwriting the second firmware with the first firmware; and after the control circuit overwrites the second firmware with the first firmware, the first protection circuit re-verifying the first secondary boot firmware.

3. The firmware verification method according to claim 2, further comprising:

when the second secondary boot firmware fails the verification, the control circuit overwriting the second firmware with the first firmware; and after the control circuit overwrites the second firmware with the first firmware, the first protection circuit re-verifying the first secondary boot firmware.

4. The firmware verification method according to claim 3, wherein the first primary boot firmware comprises a first primary signature key, the second primary boot firmware comprises a second primary signature key, and the control circuit verifies the second primary boot firmware by comparing the first primary signature key and the second primary signature key.

5. The firmware verification method according to claim 3, wherein the first primary boot firmware comprises a first primary signature key, and the control circuit verifies the second primary boot firmware by decrypting the second primary boot firmware using the first primary signature key.

6. The firmware verification method according to claim 4, wherein the first protection circuit comprises first protection firmware, the first protection firmware comprises a first protection signature key, the first secondary boot firmware comprises a first secondary signature key, and the first protection circuit verifies the first secondary boot firmware by comparing the first protection signature key and the first secondary signature key.

7. The firmware verification method according to claim 5, wherein the first protection circuit comprises first protection firmware, the first protection firmware comprises a first protection signature key, the first secondary boot firmware comprises a first secondary signature key, and the first protection circuit verifies the first secondary boot firmware by comparing the first protection signature key and the first secondary signature key.

8. The firmware verification method according to claim 6, wherein the second protection circuit comprises a second protection firmware, the second protection firmware comprises a second protection signature key, the second secondary boot firmware comprises a second secondary signature key, and the second protection circuit verifies the second secondary boot firmware by comparing the second protection signature key and the second secondary signature key.

9. The firmware verification method according to claim 7, wherein the second protection circuit comprises a second protection firmware, the second protection firmware comprises a second protection signature key, the second secondary boot firmware comprises a second secondary signature key, and the second protection circuit verifies the second secondary boot firmware by comparing the second protection signature key and the second secondary signature key.

10. The firmware verification method according to claim 8, wherein the first memory is non-writable and can only be read.

11. The firmware verification method according to claim 9, wherein the first memory is non-writable and can only be read.

12. The firmware verification method according to claim 10, wherein the first primary boot firmware comprises U-boot firmware and kernel firmware, and the control circuit verifies the second primary boot firmware according to the U-boot firmware.

13. The firmware verification method according to claim 11, wherein the first primary boot firmware comprises U-boot firmware and kernel firmware, and the control circuit verifies the second primary boot firmware according to the U-boot firmware.

14. The firmware verification method according to claim 12, wherein the first protection circuit and the second protection circuit are Root of Trust (ROT) chips, and the first protection firmware and the second protection firmware are Root of Trust (RoT) firmware.

15. The firmware verification method according to claim 13, wherein the first protection circuit and the second protection circuit are Root of Trust (ROT) chips, and the first protection firmware and the second protection firmware are Root of Trust (ROT) firmware.

16. The firmware verification method according to claim 14, wherein the first secondary boot firmware and the second secondary boot firmware are U-boot_SPL firmware.

17. A system on a chip comprising:

a first memory comprising first firmware, wherein the first firmware comprises first secondary boot firmware and first primary boot firmware;

a second memory comprising second firmware, wherein the second firmware comprises second secondary boot firmware and second primary boot firmware;

a control circuit; and a first protection circuit comprising first protection firmware, wherein the first protection circuit is configured to verify the first secondary boot firmware when the control circuit boots according to the first memory;

wherein, when the first secondary boot firmware passes the verification, the control circuit verifies the second primary boot firmware according to the first primary boot firmware, and when the second primary boot firmware passes the verification, the control circuit reboots according to the second memory.

18. The system on a chip according to claim 17, further comprising:

a second protection circuit comprising second protection firmware, wherein the second protection circuit is configured to verify the second secondary boot firmware when the control circuit boots according to the second memory.

19. The system on a chip according to claim 18, wherein, when the second primary boot firmware fails the verification, the control circuit overwrites the second firmware with the first firmware, and after the control circuit overwrites the second firmware with the first firmware, the first protection circuit re-verifies the first secondary boot firmware.

20. The system on a chip according to claim 19, wherein, when the second secondary boot firmware fails the verification, the control circuit overwrites the second firmware with the first firmware, and after the control circuit overwrites the second firmware with the first firmware, the first protection circuit re-verifies the first secondary boot firmware.

* * * * *